June 3, 1958    M. POSSATI ET AL    2,836,898
COMPARATOR HAVING REED SUPPORTED, LOCKABLE FEELERS
AND CAPACITIVE RESPONSE MEANS
Filed July 6, 1953    2 Sheets-Sheet 2
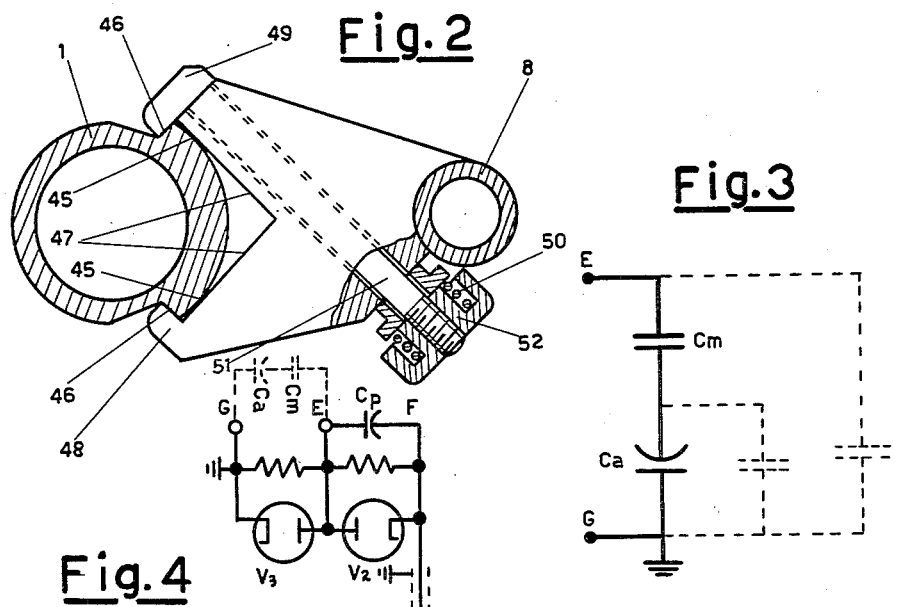
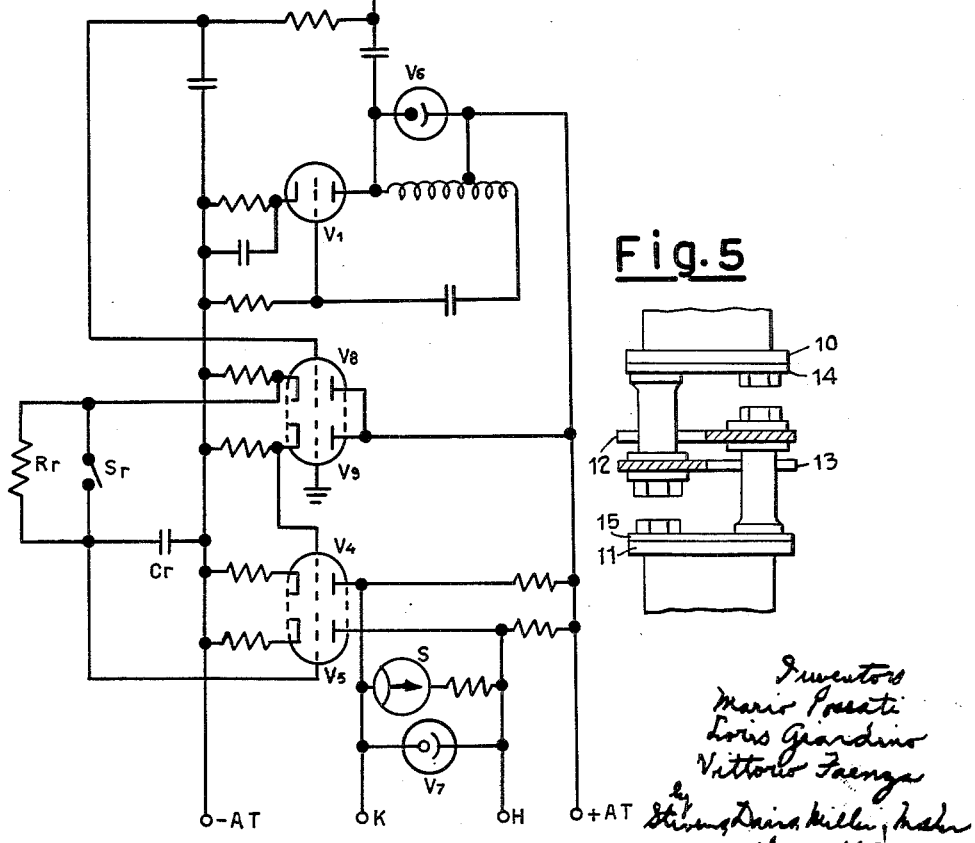

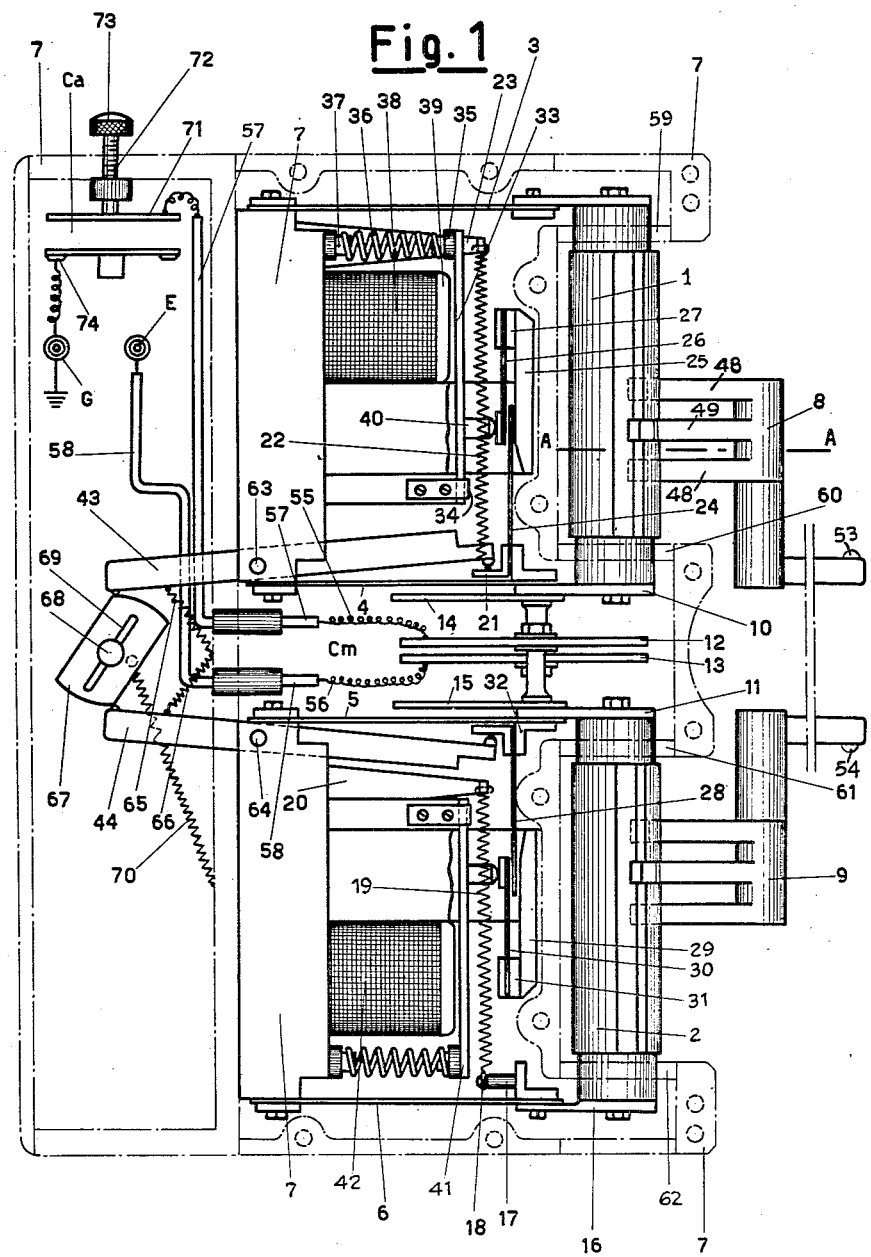

United States Patent Office 2,836,898
Patented June 3, 1958

2,836,898

COMPARATOR HAVING REED SUPPORTED, LOCKABLE FEELERS AND CAPACITIVE RESPONSE MEANS

Mario Possati, Loris Giardino, and Vittorio Faenza, Milan, Italy

Application July 6, 1953, Serial No. 366,252

Claims priority, application Italy July 10, 1952

19 Claims. (Cl. 33—147)

The present invention relates to an electric capacitance comparator micrometer adapted for the continuous or non-continuous testing of the dimensions of mechanical pieces of work and more particularly for the checking of the dimensions of pieces in course of being worked and subjected to vibrations or in movement with periodical losses of contact between the piece and the feelers of the micrometer.

The devices of that kind, as built according to conventional technique, suffer considerable limitations of use particularly in measuring pieces in course of being worked, with which the space requirements and the presence of vibrations impose very severe operating conditions. Thus it is not possible with known devices to carry out measurements of internal diameters in the presence of the working tools, owing to the excessive space required by the feelers; or with devices having only one feeler, the measurement is influenced by deformation and play of the operating machine and turns out to be not very accurate; it is impossible as well, with conventional devices, to carry out measurements on surfaces in course of being worked (and, hence, being in movement) in the presence of discontinuities of said surfaces (bores, grooves), or if the working conditions required that the measurement be effected only periodically; moreover, the presence of mechanical micrometric devices for effecting the zero setting involves with conventional devices a lot of inconveniences regarding the mechanical stability of the zero in the presence of vibrations, and the life-time of those members subject to wear.

It is an object of the present invention to obviate the aforementioned and other inconveniences affecting the known devices for testing the dimensions of pieces while being worked, and it is more in particular an object of the invention to provide an electric capacitance comparator micrometer of simple construction, safe and accurate in operation and of easy and wide use.

It is another object of the present invention to provide a connection of the feelers with the mobile assemblies of the micrometer, which affords an easy longitudinal friction sliding of the feelers to effect rough zeroizing of the apparatus and the possibility of locking them at any point of their longitudinal stroke and of removing them from the mobile assemblies.

It is a further object of the invention to provide mass symmetry and yielding quality of the mobile assemblies carrying the feelers and the plates of the measuring capacitor.

It is still a further object of the invention to afford with merely electric means the zeroizing of the comparator micrometer in a very wide range although preserving unaltered sensitivity of measurement.

Another object of the invention is to provide an electric controlled locking of the mobile assemblies and the simultaneous insertion of a convenient delay in the indication of the measurement in such a manner as to enable one to face periodical losses of contact between the workpiece and the feelers and to keep the indicated measure constant in practice.

Further objects of the invention will appear evident from the following detailed description and from the respective drawings, wherein:

Fig. 1 represents a diagrammatical front view of the comparator micrometer according to the invention;

Fig. 2 represents a section along A—A of Fig. 1 and shows the connection of a feeler with its respective mobile assembly;

Fig. 3 represents the electric connection and the function of the compensating capacitor in respect to the measuring capacitor;

Fig. 4 represents the electric circuit diagram for the feeding and measuring, which is to be connected to the terminals G—E of the comparator micrometer according to the invention;

Fig. 5 is a side view of the measuring capacitor partly in section.

With reference to the drawings, Fig. 1 shows the structure of the comparator micrometer in one embodiment of the invention.

The mechanical members taking part in measurement are essentially constituted by the mobile assemblies or equipments 1 and 2 guided by the springs 3, 4 and 5, 6 respectively constituted by flat metal laminae having their larger faces normal to the sheet of the drawing, said laminae being fixed to the case 7 of the apparatus at one end and being connected at the other end to said mobile assemblies in such a manner as to form two symmetric rectangles 3, 1, 4 and 5, 2, 6.

To the assemblies constituted by the small cylindrical rods 1 and 2 there are connected the feelers 8 and 9 respectively. To the lower end 10 of the rod 1 there is fixed—and electrically insulated from ground—a plate 13 of a measuring air capacitor $C_m$ whose other plate 12, which too is insulated from ground, is fixed to the upper end 11 of the rod 2. To the end 10 there is also fixed a shield plate 14 and to the end 11 an analogous plate 15, as seen most clearly in Figure 5. To the lower end 16 of the rod 2 there is fixed a pin 17 carrying the end 18 of a spring 19 having its upper end fixed to the piece 20 rigid with the case 7. In an analogous manner, to the lower end of the rod 1 there is fixed at 21 the lower end of a spring 22 whose upper end is fixed to the piece 23 rigid with the case 7. To the lower end 10 of the mobile assembly 1 there is also fixed a vertical lamina 24 which penetrates at top into the space comprised between the lamina 26, mounted by means 27 to the piece 25, and the piece 25 fixed to the case 7 of the apparatus. In an analogous manner, to the upper end 11 of the mobile assembly 2 there is fixed at 32 a vertical lamina 28 which penetrates below into the space confined between the lamina 30, mounted by means 31 to the piece 29, and the piece 29 fixed to the case 7.

A lever 33 is fulcrumed at 34 and subjected at its upper end 35 to the action of a spring 36 fixed at 37 to the case of the apparatus. Rigid with said lever 33 there is a pin 40 acting by effect of the expansion of spring 36, against the lamina 26, thus clamping the lamina 24 carried by the mobile assembly between the lamina 26 and the piece 25 fixed to the case. An electromagnet 38 presents its pole piece 39 facing the lever 33 of ferromagnetic material, whence if it is excited it attracts said lever so as to liberate the lamina 24 from the grip of the lamina 26 and of the piece 25. In the position shown in Fig. 1, the electromagnet 38 is excited. The same is true for the lever 41 and the electromagnet 42 relative to the lower assembly.

The lever 43 is pivoted at 63 and subjected to the action of a spring 65 which holds its right hand end detached from the piece 21 fixed to the mobile assembly 1. In an analogous manner, the lever 44, pivoted at 64, is subjected to the action of a spring 66 which holds its end detached from the mobile assembly 2. An eccentric 67 is pivoted at 68 and subjected to the action of the spring 70 which tends to make it rotate in clockwise direction. A handle 69 is connected to said eccentric 67 and by turning it in counterclockwise direction, the left hand ends of the levers 43 and 44 are moved away from each other so that the right hand ends, acting upon the pieces 21 and 32, take the mobile assmblies 1 and 2 to their basic position, viz. to the position in which the springs 3, 4, 5, 6 are not inflected.

The connection of the feelers 8 and 9 to the mobile assemblies 1 and 2, is shown in detail in Fig. 2 being a section along A—A of Fig. 1. The assembly 1 has two cylindrical surface sectors 45 and two plane surfaces 46 directed along two generating lines. The feeler 8 has two plane and perpendicular surfaces 47 which rest on the cylindrical surfaces 45, three fixed teeth 48 and one mobile tooth 49 carried by a screw bolt 51 actuatable by means of the knob 52 and subjected to the action of spring 50. At their end opposed to the coupling end, the feelers 8 and 9 (Fig. 1) carry the diamond contacts 53 and 54 set therein, to contact the work-piece. By construction, the straight line connecting the vertices of 53 and 54 is parallel to the axes of the assemblies 1 and 2.

To the plates of the condenser $C_m$ there are connected the flexible conductors 55 and 56 which are connected to the shielded conductors 57 and 58. The conductor 58 is connected to the mobile plate of a compensating capacitor $C_a$ having its other plate connected to the grounded terminal G. The conductor 58 is connected to the terminal E. The mobile plate 71 of the compensating capacitor $C_a$ is displaced by means of the screw 72, by turning the small knob 73. The diagram of the connections of the compensating capacitor $C_a$, on one side in series with the measuring capacitor $C_m$ and on the other side grounded, is shown in Fig. 3.

Having described the structure of the micrometer in detail, now its operation will be illustrated.

Place the apparatus in vertical position as indicated in Fig. 1 in the proximity of the work-piece to be measured. Take then the mobile assemblies to their basic positions by acting upon the levers 43 and 44 by turning the handle 69. Then slide the feelers 8 and 9 along the respective guides unscrewing a length of the bolt 51 and pressing the knob 52 against the action of the spring 50. The coupling between the mobile assemblies and feelers takes place along surfaces which enable the feelers both to slide with friction along the assemblies and also to be tightened and locked to said assemblies or, as one likes, to be completely detached therefrom. The fixed teeth 48 and the mobile tooth 49 prevent any rotation of the feeler in respect to the axis of the assembly. The mobile tooth 49 if pressed against the plane guide 46 by the thrust of the spring 50, allows sliding without any play of the feeler; if tightened against the guide, by means of the screw bolt 51, it strongly locks the feeler to the assembly, and finally if the bolt 51 is unscrewed and the spring 50 is forced by pressing the knob 52 so as to take said tooth away from the guide, the feeler is detached.

Now adjust the diamond tips 53 and 54 to contact the piece to be tested comparatively in respect to a basic value $Q_0$. Then screw in the bolt 51 and lock the feelers. Then liberate the mobile assemblies 1 and 2 from the action of the levers 43 and 44. Since in the basic position the guide springs 3, 4, 5 and 6 are not inflected nor loaded otherwise, the two auxiliary springs 22 and 19 (whose tension is adjustable at 23 and 20), accomplish the task of balancing the weight of the mobile masses. When the instrument is employed in the vertical position, it will be apparent that the tip 53 is biased upwardly against gravity by the spring 22, while the tip 54 is deflected downwardly against the spring 19 because of the force of gravity. Although springs 19, 22 have to furnish different tensions, it is advisable that they may have the same elastic yieldability.

If D indicates the generic distance between the plates of the measuring capacitor $C_m$ and $D_0$ the value of D if the assemblies are in the basic position, the task of the members described is to obtain that the variations of distance D in respect to the basic value $D_0$ be quite equivalent to the variations of the length 53—54 (which may be indicated with A—B) in respect to the basic value $Q_0$, for which the apparatus should mark zero. It should be noted that for measurements of internal dimensions, the above mentioned equivalence should conveniently have opposite signs. This is obtained by having recourse to connections of the plates of the capacitor in such a manner that the lower plate be connected to the upper assembly and vice versa. The contrary should be done for measuring external dimensions.

The guide springs afford the movement of the mobile assemblies without employing hinges or slide couplings and without any play, and simultaneously they constrain that movement, for small displacements about the basic position, to be pure translatory displacements in a direction perpendicular to said springs. If the structures are well dimensioned, in the range of normal operating stresses the guide action of the springs is so stable that even strongly eccentric stresses such as one has with long overhanging feelers, do not deflect the displacements of the assemblies from the pure translatory movement said above. Still in the range of normal operating stresses, the mobile assemblies, the capacitor plates and the respective connections may be considered to be rigid in practice, if this can be held valid also for the feelers, this suffices to conclude that the variations of D are equivalent to the variations of AB.

But even if it becomes necessary, for reasons of space requirement or others, to use not perfectly rigid feelers, it is possible to attain the same result, provided some conditions be met. Firstly it is necessary that the feelers, if subjected at the contact points with the work-piece to stresses in a direction perpendicular to AB, they undergo deformations lying entirely in a plane which, too, is perpendicular to AB so that the distance D be not altered by the presence of any possible tangential components created by friction in the thrusts on the work-piece; this condition is met without any excessive difficulties by imparting to the feelers suitable shapes (it is for example sufficient for the purpose, but not necessary, that the deformable parts of the feelers be symmetrical in respect to a plane parallel or perpendicular to the direction AB). It is further necessary that the normal components of the thrusts on the work-piece be constant and independent of the variations of AB; and this independence is never met strictly; consequently, instead of equality one has only proportionality between the variations of AB and those of D, and the gauging of the apparatus is altered thereby. However in practice, owing to the smallness of the range in which the variations of AB are of interest to the end of measuring, and owing to the fact that the feelers are in any case less yielding than the guide and auxiliary springs, the coefficient of proportionality mentioned above is so close to unity that the consequent error of gauging results to be negligible.

In order then that D may not be affected by equal and concordant displacements of the points A and B, it is necessary, in the presence of elastic deformations in the feelers, that the elastic yieldability of the guide and auxiliary springs, and that of the feelers, be respectively equal for one and for the other structure. If the same property has to be valid also in dynamical conditions, that is, when the displacements of A and of B are rapidly variable, due wholly or in part to vibrations of the piece, to the equality of elastic yieldabilities there must be added equality of the movable masses. The one and the other are implicit in the general arrangement chosen (see Fig. 1) according to which the two structures are equal and symmetrical; the equality and symmetry required can be practically achieved with sufficient approximation.

The initial zeroizing of the micrometer on the basic value of the dimension to be tested, that is to say, the operation whereby—as far as the mechanical members are concerned—the distance $D_0$ is made to correspond to the distance $Q_0$ between the points of contact with the workpiece, is carried out, as mentioned, in the following manner:

The mobile assemblies are stopped by means of the levers 43 and 44 in the basic position; using a gage block in which the dimension to be tested has the basic value $Q_0$, the feelers are made to slide until contacting the piece at the ends of the dimension, then the feelers are locked and the assemblies are released. It is seldom necessary, and it would not be possible in the manner above described, that after terminating the operation the distance between the plates of the measuring capacitor should have accurately the value $D_0$; it suffices that it is within the range of action of the capacitive compensator with which the zeroizing is then completed electrically; said range of action is by some hundred times larger than the measuring sensitivity (e. g. about 300 μ for millesimal measurements); only for this reason the mechanical zeroizing can be accomplished in such a simple manner, without any members for micrometric displacements, and the final locking of the feelers is possible.

The capacitive compensator for the electric zeroizing is constituted by the variable capacitor $C_a$ (see Fig. 3) connected in series between the measuring capacitor $C_m$ and the ground. In order that the compensator can accomplish its task of zeroizing in so wide a range as aforesaid without influencing the sensitivity of measuring, the capacity of $C_m$ which is in series therewith must be the whole and only capacity which is connected to the electric field comprised between the plane facing surfaces of its plates; any other line of the electric field must terminate with an invariable path to ground, whereby the corresponding capacities constitute two fixed capacities with respect to ground as indicated with dotted lines in Fig. 3. The above is obtained with the shielding action of the plates 14 and 15 (see Fig. 1) electrically connected to ground and in fixed position in respect to the plates, and by the use of shielded conductors 57 and 58 for the connecting of the plates to the remaining circuit.

The micrometer according to the invention is equipped (see Fig. 1) with a rapid locking device, electrically controlled, of the mobile assemblies 1 and 2, obtained as already mentioned, by means of the locking of the elastic laminae or tongues 24 and 28 fixed to the mobile assembly, to the fixed pieces 26 and 30 facing them. Owing to its elasticity, the locking does not stress in practice the guide springs of the apparatus.

Locking and unlocking are extremely rapid operations, requiring times of the order of one hundredth of second.

The blocking or locking device described just now affords the possibility to carry out without any impacts between the work-piece and the feelers, continuous measurements on surfaces in movement, even if interrupted by holes or grooves, and to carry out measurements with periodical abandonment of contact between the work-piece and the feeler, as due to relative movement between the piece and the micrometer. Moreover, it becomes possible to effect measurements on surfaces in movement limiting the test to determined points or zones of said surfaces, or to keep the last measurement indication during an unlimited length of time after taking the piece away from the apparatus.

With reference to Fig. 1, the apparatus can be enclosed in a seal-tight manner according to the dotted line, in such a manner that there remain exposed only the sections of the mobile assemblies that carry the coupling surfaces for coupling with the feelers, as well as the feelers; these members, if made of suitable inoxidizable (stainless) material, may remain outside without any damage. The exposed surfaces are easy to be inspected and cleaned, particularly if the feelers are detached.

The sealing of the closing surface by the mobile assemblies is obtained with the flexible membranes 59, 60, 61, 62, which keep continuity of the tight seal; this is facilitated by the limited stroke of said assemblies.

The electric circuits are clearly illustrated by the circuit diagram of Fig. 4. The oscillator tube $V_1$ supplies alternated voltage with a frequency of the order of 1 mc., the frequency stability of which is not of interest while the amplitude is stabilized by absorption by the voltage regulating gas tube $V_6$, directly connected to the coil of the oscillating circuit. By means of a coaxial cable, the capacity of which is part of the overall capacity of the oscillating circuit, the high frequency voltage is fed to a capacity divider constituted respectively by the semi-fixed capacitor $C_p$ and by the capacitors $C_m$ and $C_a$. The alternated voltages which localize between the points G and E and, respectively, E and F, are rectified and opposed by the diodes $V_2$ and $V_3$, so that between the points G and F there appears a continuous voltage proportional to the difference between the alternated voltages, which the same coaxial cable transmits to the balanced amplifier constituted by the triodes $V_4$—$V_5$ and $V_8$—$V_9$.

The use of high frequency is necessary to obtain, notwithstanding the smallness of the capacities of the divider (which are of the order of about ten micro-microfarads), sufficiently low capacitive reactances so as to render negligible the influence of the shunt resistances and of the internal resistances of the rectifiers upon the division of the alternated voltages and upon the rectifying efficiency.

The coaxial cable affords the possibility to separate the divider-rectifier group, which necessarily must be housed in the frame of the mechanical members, from the remaining circuit parts, thus not involving cumbersome dimensions of the same and heating of the mechanical members. The rectifying that follows immediately the dividing of the alternated voltages, takes away ambiguity of sign from the difference of voltages and the balancing of opposed voltages from requiring separately the balancing of the active components and of the reactive ones.

The indicator instrument S is a movable coil voltmeter, with central zero; the voltage regulator gas tube $V_7$ serves to prevent damage from excessive voltages. The same voltage that acts upon the instrument is accessible at the terminals H and K and may be employed for automatic controls depending on the measurement (control of operating machines in the case of measurements in the machine during work, or of selecting and classifying members in the case of mass control on the bench).

In the balanced amplifier supplying the indication of the measurement there is inserted a coupling to which the high capacity $C_r$ (some microfarads) and the high resistance $R_r$ (some megohms)—if the switch $S_r$ is open—give a high time constant (more than some ten seconds) adapted to provide a considerable delay in the indication of the measurement. If the switch $S_r$ is closed, $R_r$ is short-circuited; in that case the triode $V_8$, which acts as an amplifier with cathode coupling (cathode follower), although having high impedance of signal input, supplies a sufficiently low output resistance (some thousands of ohms) so as to contain, notwithstanding the presence of the high capacity $C_r$, the overall time constant within some hundredths of a second. The triodes $V_9$ and $V_4$ serve to maintain the overall circuit balanced in respect to any possible variations of feed voltage.

The switch $S_r$ is conveniently synchronized with the periodical losses of contact between the piece and the feelers.

With this contrivance it is possible to carry out measurements on mechanical pieces in movement even if there is a periodical loss of contact between the piece and the measuring apparatus, without having the indicated measurement appear discontinuous or deviate from the measurement while in contact. This is obtained by imparting to the overall time constant of the circuits supplying the measurement indication, alternately, two values, one of which is some thousands of times higher than the other one, the change being pre-arranged in such a way that the higher time constant becomes effective immediately prior to the loss of contact, while the smaller constant is effective immediately after restoration of contact.

What we claim is:

1. An electric capacitance comparator micrometer, comprising in combination a frame, two pairs of flat springs parallel to each other fitted in said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, an electric measuring air capacitor the plates of which facing each other are fixed respectively to the two mobile assemblies, two slidable feelers slidable on said rods, said rods being equipped each with two longitudinal grooves defined by two coaxial sectors of cylindrical surface having different radii and joined by two plane surfaces, the feelers being provided with two plane and perpendicular surfaces resting on the cylindrical surfaces, with fixed teeth and with at least one displaceable tooth pressed against the respective groove by effect of a screw bolt and a spring, electric circuits adapted to supply the indication of the measurement.

2. An electric capacitance comparator micrometer, comprising in combination a frame, two pairs of flat springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, an electric measuring air capacitor the plates of which facing each other are fixed respectively to the two mobile assemblies, two feelers slidable on said small rods, elastic means for compensating the effect of the weight of the two mobile assemblies carrying the feelers and constituted by two auxiliary variable tension springs, electric circuits adapted to supply the indication of measurement.

3. An electric capacitance comparator micrometer, comprising in combination a frame, two pairs of flat guide springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, elastic means for compensating the effect of the weight of the two mobile assemblies carrying the feelers, the two equipments constituted by the mobile assemblies, flat guide springs and elastic means for compensating the effect of the weight having symmetry of elastic yieldability and of mobile masses, two feelers slidable on said small rods, an electric measuring air capacitor the plates of which facing each other are fixed respectively to the two mobile assemblies and electric circuits adapted to supply the indication of measurement.

4. An electric capacitance comparator micrometer, comprising in combination a frame, two pairs of flat springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, an electric measuring air capacitor the plates of which facing each other are fixed respectively to the two mobile assemblies, two feelers slidable on said small rods, shielding plates electrically grounded and in fixed position in respect to the plates of the measuring capacitor, said plates being connected to the remaining circuit by means of shielded conductors, a compensating capacitor connected on one side in series to said measuring capacitor and on the other side grounded and electric circuits adapted to supply the indication of measurement.

5. An electric capacitance comparator micrometer comprising in combination a frame, two pairs of flat springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, an electric measuring air capacitor the plates of which facing each other are fixed respectively to the two mobile assemblies, an electrically controlled locking system for the mobile assemblies, two feelers each connected to one of said rods and electric circuits adapted to supply the indication of measurement.

6. An electric capacitance comparator micrometer comprising in combination a frame, two pairs of flat springs parallel to each other fitted to said frame, two mobile assemblies constituted by two small bars the axes of which coincide in a straight line perpendicular to said flat springs and the ends of which are fixed to the ends of said flat springs, in such a manner as to constitute two equal rectangles each of which has two parallel sides constituted by the springs and one side constituted by a small rod, an electric measuring air capacitor the plates of which facing each other are fixed respectively to the two mobile assemblies, a locking system for the mobile assemblies, said system comprising an elastic tongue fixed to the mobile assembly against two surfaces facing each other one of which is elastic and the other fixed, a lever, a spring connected between said lever and fixed surface, an electromagnet for actuating said lever, and electric circuits adapted to supply the indication of measurement.

7. An electric capacitance measuring micrometer comprising in combination a frame, two pairs of flat springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, an electric measuring air capacitor the plates of which facing each other are fixed respectively to the two mobile assemblies, two feelers each of which is carried by a mobile assembly, electric circuits adapted to supply the indication of measurement and means for varying the time constant of said circuits to compensate for periodical losses of contact between the piece to be tested and the feelers.

8. An electric capacitance comparator micrometer comprising in combination a frame, two pairs of flat springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, an electric measuring air capacitor the plates of which facing each other are fixed respectively to the two mobile assemblies, two feelers each of which is carried by a mobile assembly, electric circuits adapted to supply the indication of measurement and means for varying the time constant of said circuits, constituted by a switch to compensate for periodical losses of contact between the piece to be tested and the feelers, adapted to short-circuit a resistance of high value.

9. An electric capacitance comparator micrometer comprising in combination a frame, two pairs of flat guide springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod; an electric measuring air capacitor the plates of which facing each other are fixed respectively to the two mobile assemblies, mechanical means comprising two slidable feelers slidable on the respective assemblies, said assemblies being provided each with two longitudinal grooves defined by two sectors of cylindrical surface having different radii and joined by two plane surfaces, the feelers being provided with two plane and perpendicular surfaces resting on the cylindrical surfaces, with fixed teeth and with at least one displaceable tooth pressed against the respective groove by effect of a screw bolt and with a spring, elastic means for compensating the weight of the two mobile assemblies, the two equipments constituted by the mobile assemblies, flat guide springs and elastic means for compensating the effect of weight having symmetry of elastic yieldability and of mobile masses, electrically grounded shielding plates in fixed position in respect to the plates of the measuring capacitor, said plates being connected to the remaining circuit by means of shielded conductors, a compensating capacitor connected on one side in series to said measuring capacitor and grounded on the other side, electric circuits adapted to supply the indication of measurement and said mechanical means zeroing at the basic value of the dimension to be tested within wide tolerances and a capacitive compensator for its successive improvement.

10. An electric capacitance comparator micrometer comprising in combination a frame, two pairs of flat guide springs parallel to each other fitted to said frame, two mobile assemblies constituted by two small rods the axes of which coincide in a straight line perpendicular to said flat springs and the ends of which are fixed to the ends of said flat springs in such a manner as to constitute two equal rectangles each of which has two parallel sides constituted by the springs and one side constituted by a small rod, a feeler slidably carried by each said mobile assembly, elastic means for compensating the effect of weight of the two mobile assemblies carrying the feelers, the two equipments constituted by the mobile assemblies, flat guide springs and elastic means for compensating the effect of weight having symmetry of elastic yieldability and of mobile masses, a measuring capacitor the plates of which are correlated to movement of said feelers, a compensator capacitor connected on one side in series to said measuring capacitor and on the other side to ground, an electrically controlled locking system for the mobile assemblies, electric circuits adapted to supply the indication of the measurement and means for varying the time constant of said circuits to compensate for periodical losses of contact between the piece to be tested and the feelers.

11. A comparator micrometer for measuring dimensions of a work piece comprising a pair of feelers, leaf spring suspension means mounting said feelers in alignment for limited movement toward and away from each other, means for biasing at least one of said feelers into engagement with said work piece, locking means for locking said feelers in fixed positions, and means for indicating the relative positions of said feelers.

12. A comparator micrometer for measuring dimensions of a work piece comprising a pair of feelers, leaf spring suspension means mounting said feelers in alignment for limited movement toward and away from each other, means for biasing at least one of said feelers into engagement with said work piece, locking means for locking said feelers in fixed positions, means for controlling said locking means, and means for indicating the relative positions of said feelers.

13. A comparator micrometer for measuring dimensions of a work piece comprising a pair of feelers, leaf spring suspension means mounting said feelers in alignment for limited movement toward and away from each other, means for biasing at least one of said feelers into engagement with said work piece, means for locking said feelers in fixed positions, electromagnetic means for releasing said feelers, and means for indicating the relative positions of said feelers.

14. A comparator micrometer for measuring dimensions of a work piece comprising a pair of feelers, leaf spring suspension means mounting said feelers in alignment for limited movement toward and away from each other, means for biasing at least one of said feelers into engagement with said workpiece, means for urging said feelers in opposite directions and for holding said feelers in fixed positions, means for locking said feelers in fixed positions, and means for indicating the relative positions of said feelers.

15. A comparator micrometer for measuring dimensions of a work piece comprising a pair of feelers, leaf spring suspension means mounting said feelers in alignment for limited movement toward and away from each other, means for biasing at least one of said feelers into engagement with said workpiece, locking means for locking said feelers in fixed positions, a capacitor comprised of two plates with each plate connected to move responsive to one of said feelers, and an electrical circuit connected to said capacitor adapted to indicate the relative positions of said plates.

16. A comparator micrometer for measuring dimensions of a work piece comprising a pair of feelers, leaf spring suspension means mounting said feelers in alignment for limited movement toward and away from each other, means for biasing at least one of said feelers into engagement with said workpiece, locking means for locking said feelers in fixed positions, means for controlling said locking means, a capacitor comprised of two plates with each plate connected to move responsive to one of said feelers, and an electrical circuit connected to said capacitor adapted to indicate the relative positions of said plates.

17. A comparator micrometer for measuring dimensions of a work piece comprising a pair of feelers, leaf spring suspension means mounting said feelers in alignment for limited movement toward and away from each other, means for biasing at least one of said feelers into engagement with said workpiece, means for locking said feelers in fixed positions, electromagnetic means for releasing said feelers, a capacitor comprised of two plates with each plate connected to move responsive to one of said feelers, and an electrical circuit connected to said capacitor adapted to indicate the relative positions of said plates.

18. A comparator micrometer for measuring dimensions of a work piece comprising a pair of feelers, leaf spring suspension means mounting said feelers in alignment for limited movement toward and away from each other, means for biasing at least one of said feelers into engagement with said workpiece, means for urging said feelers in opposite directions and for holding said feelers in fixed positions, means for locking said feelers in fixed positions, a capacitor comprised of two plates with each plate connected to move responsive to one of said feelers, and an electrical circuit connected to said capacitor adapted to indicate the relative positions of said plates.

19. A comparator micrometer for measuring dimensions of a work piece comprising a pair of feelers, leaf spring suspension means mounting said feelers in alignment for limited movement toward and away from each other, means for biasing at least one of said feelers into engagement with said workpiece, a measuring capacitor comprised of two plates with each plate connected to move responsive to one of said feelers, a compensating capacitor connected in series to said measuring capacitor, and an electrical circuit connected to said capacitors adapted to indicate the relative positions of the plates of said measuring capacitor.

References Cited in the file of this patent

UNITED STATES PATENTS

| | | |
|---|---|---|
| 2,004,361 | Arms et al. | June 11, 1935 |
| 2,081,738 | Conover | May 25, 1937 |
| 2,122,664 | Terry | July 5, 1938 |
| 2,177,399 | Aller | Oct. 24, 1939 |
| 2,387,496 | Cornelius | Oct. 23, 1945 |
| 2,503,851 | Snow | Apr. 11, 1950 |
| 2,514,847 | Coroniti et al. | July 11, 1950 |
| 2,633,642 | Levesque | Apr. 7, 1953 |
| 2,691,826 | Breisch | Oct. 19, 1954 |

FOREIGN PATENTS

| | | |
|---|---|---|
| 883,881 | France | July 23, 1943 |
| 567,401 | Great Britain | Feb. 13, 1945 |